United States Patent
Saito et al.

(10) Patent No.: US 6,686,083 B1
(45) Date of Patent: Feb. 3, 2004

(54) CARBONACEOUS COMPOSITE MATERIAL, PROCESS FOR PRODUCTION THEREOF, FUEL CELL SEPARATOR, AND POLYMER ELECTROLYTE FUEL CELL

(75) Inventors: Kazuo Saito, Chiba (JP); Atsushi Hagiwara, Chiba (JP); Takashi Maki, Chiba (JP); Atsushi Miyazawa, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 114 days.

(21) Appl. No.: 09/691,213

(22) Filed: Oct. 19, 2000

(30) Foreign Application Priority Data

Oct. 20, 1999 (JP) ............................................. 11-298204

(51) Int. Cl.⁷ ................................................. H01M 2/00
(52) U.S. Cl. ........................... 429/34; 429/247; 429/249
(58) Field of Search ............................ 429/39, 297, 299

(56) References Cited

U.S. PATENT DOCUMENTS

| | | | | |
|---|---|---|---|---|
| 4,592,968 A | * | 6/1986 | Taylor | 429/34 |
| 4,643,956 A | * | 2/1987 | Sandelli et al. | 429/34 |
| 4,737,421 A | * | 4/1988 | Uemura et al. | 429/34 |
| 5,236,687 A | * | 8/1993 | Fukuda et al. | 423/447.2 |
| 5,804,116 A | | 9/1998 | Schmid et al. | |
| 6,242,124 B1 | * | 6/2001 | Saito et al. | 429/38 |
| 6,444,344 B1 | * | 9/2002 | Saito et al. | 429/34 |

FOREIGN PATENT DOCUMENTS

| | | |
|---|---|---|
| GB | 2 177 388 | 1/1987 |
| WO | WO 00/16424 | 3/2000 |

* cited by examiner

Primary Examiner—Patrick Ryan
Assistant Examiner—Julian Mercado
(74) Attorney, Agent, or Firm—Birch, Stewart, Kolasch & Birch, LLP

(57) ABSTRACT

A carbonaceous composite material molded from a carbonaceous composite compound composed mainly of graphite, a thermosetting resin, and a fibrous base material, wherein molding is carried out in such a way that said fibrous base material is oriented in said carbonaceous composite material; a process for producing said carbonaceous composite material; a fuel cell separator having said carbonaceous composite material as a component; and a polymer electrolyte fuel cell. The carbonaceous composite material can be produced by injection molding, transfer molding or extrusion molding without difficulties encountered in the past. It has high strength, with a minimum amount of warpage. It contributes to productivity.

9 Claims, 3 Drawing Sheets

CARBONACEOUS COMPOSITE MATERIAL, PROCESS FOR PRODUCTION THEREOF, FUEL CELL SEPARATOR, AND POLYMER ELECTROLYTE FUEL CELL

BACKGROUND OF THE INVENTION

The present invention relates to a carbonaceous composite material superior in strength and immune to warpage, a process for efficient production of said carbonaceous composite material, a fuel cell separator made of said carbonaceous composite material, and a polymer electrolyte fuel cell superior in vibration and shock resistance.

A fuel cell system, particularly that of solid high polymer type, consists of tens or hundreds of unit cells' which are stacked to form the battery module. As shown in FIG. 1, each unit cell is made up of one electrolytic membrane of solid high polymer 2, two gas diffusion electrodes of carbon paper 3, and two separators 1, 1, each having ribs 1a which form grooves 4 for gas (such as hydrogen and oxygen) to be supplied and discharged.

The fact that each unit cell is low in output voltage makes it necessary to stack tens or hundreds of unit cells in order to construct a fuel cell system with a practical capacity of the order of 100 kW. This has aroused a demand for efficient mass-production of fuel cell separators.

Unfortunately, the conventional fuel cell separator, which is composed mainly of a thermosetting resin and graphite, lacks fluidity on account of a large amount of graphite incorporated to impart electrical conductivity. Therefore, it presents difficulties in its injection molding and transfer molding. It is usually produced by the compression molding process which consists of placing the compound in a mold and pressing it at 150–160° C. and 14.7–29.4 MPa for 5–10 minutes. Compression molding, which takes a long time, is inefficient for mass production.

The fuel cell separator 1 mentioned above has a unique structure with a number of grooves 4 for gas supply and discharge which are formed on one or both sides of a thin plate, as shown in FIGS. 2(A) and 2(B). The thin bottom of the groove causes the fuel cell separator to warp or crack easily.

SUMMARY OF THE INVENTION

The present invention was completed in view of the foregoing. Accordingly, it is an object of the present invention to provide a carbonaceous composite material superior in strength and immune to warpage, a process for efficient production of said carbonaceous composite material, a fuel cell separator made of said carbonaceous composite material, and a polymer electrolyte fuel cell superior in vibration and shock resistance.

In order to achieve the above-mentioned object, the present inventor carried out a series of researches, which led to the finding that a fuel cell separator is obtained from a carbonaceous composite material composed mainly of graphite, a thermosetting resin, and a fibrous base material by molding in such a way that said fibrous base material is oriented at 60–120 degrees with respect to the thickness direction of thick parts. The thus oriented fibrous substrate effectively functions as a reinforcement, thereby preventing warpage and adding strength to thin parts (or weak parts). The resulting fuel cell separator has good strength.

Moreover, the present inventors carried out extensive studies on the process for efficiently producing the carbonaceous composite material. As the result, it was found that the fibrous base material imparts an adequate degree of fluidity to a mixture composed mainly of graphite and a thermosetting resin, thereby rendering the mixture suitable for injection molding and transfer molding.

To be concrete, a mixture composed of 100 pbw of graphite, 15–45 pbw of thermosetting resin, and 3–35 pbw of fibrous base material is suitable for injection molding and transfer molding on account of its adequate fluidity due to each component. The mixture does not stick to the screw of injection or extrusion molding machines, nor does it suffer slipping between the screw and the cylinder (due to compression and sticking). Thus it is possible to eliminate difficulties which have previously been encountered in injection molding and transfer molding. Molding is carried out in such a way that the fibrous base material is oriented at 60–120 degrees with respect to the thickness direction of thick parts. Therefore, the fibrous base material protects the molded product from warpage and reinforces thin parts (or weak parts). The above-mentioned mixture and molding method permit the efficient mass-production of strong warp-free fuel cell separators. These separators are suitable for the polymer electrolyte fuel cell which need good vibration and shock resistance.

The present invention provides a carbonaceous composite material, a process for production thereof, a fuel cell separator, and a polymer electrolyte fuel cell, which are defined in the following.

(1) A carbonaceous composite material molded from a carbonaceous composite compound composed mainly of graphite, a thermosetting resin, and a fibrous base material, wherein molding is carried out in such a way that said fibrous base material is oriented in said carbonaceous composite material.

(2) A carbonaceous composite material as defined in (1) above, wherein the fibrous base material is oriented at 60–120 degrees with respect to the thickness direction of the thick parts of the molded product.

(3) A carbonaceous composite material molded from a carbonaceous composite compound composed mainly of graphite, a thermosetting resin, and a fibrous base material, wherein said graphite, thermosetting resin, and fibrous base material account for 100 pbw, 15–45 pbw, and 3–35 pbw, respectively, in the total amount.

(4) A carbonaceous composite material molded from a carbonaceous composite compound composed mainly of graphite, a thermosetting resin, and a fibrous base material as defined in (1) or (2) above, wherein said graphite, thermosetting resin, and fibrous base material account for 100 pbw, 15–45 pbw, and 3–35 pbw, respectively, in the total amount.

(5) A process for producing a carbonaceous composite material by transfer molding from a mixture composed of 100 pbw of graphite, 15–45 pbw of thermosetting resin, and 3–35 pbw of fibrous base material.

(6) A process for producing a carbonaceous composite material by injection molding from a mixture composed of 100 pbw of graphite, 15–45 pbw of thermosetting resin, and 3–35 pbw of fibrous base material.

(7) A process for producing a carbonaceous composite material as defined in (5) or (6) above, wherein the fibrous base material is oriented at 60–120 degrees with respect to the thickness direction of the thick parts of the molded product.

(8) A fuel cell separator having grooves for gas supply and discharge on one side or both sides thereof which is formed from the carbon composite material defined in any of (1) to (4) above, said fuel cell separator being characterized by a flexural strength of 40–100 MPa, a flexural modulus of 20–60 GPa, and an amount of warpage no larger than 0.5 mm, which are measured according to JIS K6911.

(9) A polymer electrolyte fuel cell which is made up of a number of unit cells, each cell consisting of a pair of electrodes holding an electrolytic membrane of solid high polymer between them and a pair of separators holding said electrodes between them, said separator forming passages for gas supply and discharge, wherein the separator is entirely or partly the fuel cell separator defined in (8) above.

DESCRIPTION OF THE PREFERRED EMBODIMENTS

Figure 1:
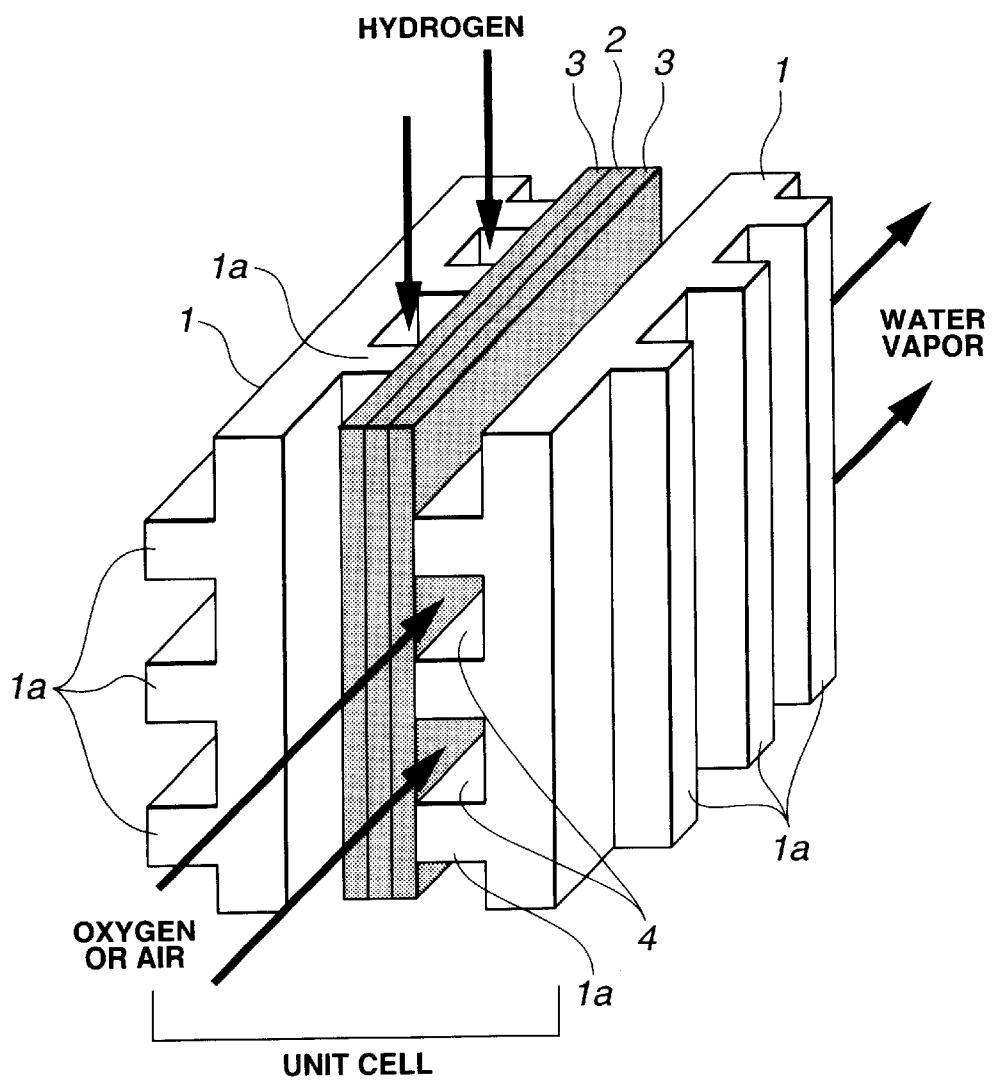
FIG. 1 is a perspective view showing one example of the fuel cell.

The invention will be described in more detail in the following.

According to the present invention, the carbonaceous composite material is obtained by molding from a carbonaceous composite compound composed mainly of graphite, a thermosetting resin, and a fibrous base material, wherein said molding is carried out in such a way that said fibrous base material is oriented in said carbonaceous composite material.

The orientation of the fibrous base material 5 is defined by the angle with respect to the thickness direction of the thick part of the molded product (separator 1). The degree of orientation should be 60–120 degrees, preferably 70–110 degrees, more desirably 80–100 degrees, and most desirably 90 degrees (right angle). The molded product, with the fibrous base material oriented in the direction for reinforcement, resists residual stress (or internal stress), prevents warpage, and has greatly enhanced strength.

The carbonaceous composite material mentioned above can be produced from a carbonaceous composite compound composed mainly of (A) graphite, (B) thermosetting resin, and (C) fibrous base material, by injection molding or transfer molding under adequate conditions.

The graphite as component (A) may be natural one or artificial one which is in flaky, bulky, needle-like, or spherical form. It should have an average particle diameter of 30–1000 µm, preferably 50–500 µm, and more preferably 50–200 µm.

The thermosetting resin as component (B) is not specifically restricted. It includes phenolic resins of resol type or novolak type, furan resins (such as furfuryl alcohol resin, furfuryl alcohol-furfural resin, and furfuryl alcohol-phenol resin), polyimide resin, polycarbodiimide resin, polyacrylonitrile resin, pyrene-phenanthrene resin, polyvinyl chloride resin, epoxy resin, urea resin, diallyl phthalate resin, unsaturated polyester resin, and melamine resin. They may be used alone or in combination with one another. Of these resins, phenolic resin and epoxy resin and their mixture are desirable.

An adequate thermosetting resin as component (B) should be selected according to fluidity required of injection or transfer molding. Fluidity is evaluated in the following manner and expressed in terms of the diameter of the molded specimen. The diameter should be 90–200 mm, preferably 100–150 mm. A compound with a small diameter will hardly fill the mold. A compound with a large diameter will give an inhomogeneous product (having poor conductivity), with the thermosetting resin migrating to the surface of the product.

Evaluation of Fluidity

A resin sample, weighing 5 g, is placed at the center of a flat mold and then compression-molded at a surface pressure of 29.4 MPa for 3 minutes, with the temperature in the melting stage being equal to the temperature for injection molding. The circular spreading of the sample in the mold is observed.

The amount of the thermosetting resin as component (B) should be 15–45 pbw, preferably 15–35 pbw, more preferably 20–35 pbw, for 100 pbw of the graphite as component (A). With an amount less than specified, the resulting compound is poor in fluidity and presents difficulties in injection molding and transfer molding. With an amount more than specified, the resulting compound is poor in conductivity on account of the relative low content of graphite.

The fibrous base material as component (C) includes inorganic and organic fibers, such as ceramics fiber, natural mineral fiber, glass fiber, metal fiber, aramide fiber, carbon fiber, cellulose fiber, acrylic fiber, potassium titanate fiber, and boron fiber. They may be used alone or in combination with one another. Of these fibers, carbon fiber is most desirable. The fiber should be 1–20 mm, preferably 3–10 mm, in length and 3–10 µm in diameter.

The amount of the fibrous base material as component (C) should be 3–35 pbw, preferably 3–25 pbw, more preferably 5–15 pbw, for 100 pbw of the graphite as component (A). With an amount less than or more than specified, the resulting compound presents difficulties in molding because of sticking to the screw of the molding machine or slipping between the screw and the cylinder of the molding machine. Therefore, the resulting compound does not achieve the object of the present invention.

The compound for the carbonaceous composite material of the present invention may be incorporated with optional additives in addition to the above-mentioned components (A) to (C). Such additives include mold release agent, metal powder, and hydrolysis preventing agent, which will improve releasability, hydrolysis resistance, and conductivity.

The release agent is not specifically restricted. It includes silicone release agent, fluorine-based release agent, metallic soap release agent, amide release agent, and wax release agent. Preferable among them are internal release agents such as carnauba wax, stearic acid, and montanic acid. The amount of the release agent should be 0–3 pbw for 100 pbw of the graphite as component (A).

The above-mentioned metal powder includes those of stainless steel, gold, silver, copper, platinum, titanium, aluminum, and nickel. The metal powder should have an average diameter of 5–30 µm.

According to the present invention, the carbonaceous composite material is produced by injection molding or transfer molding from a mixture composed of 100 pbw of graphite as component (A), 15–45 pbw of thermoplastic resin as component (B), and 3–35 pbw of fibrous base material as component (C). Molding should be carried out in such a way that said fibrous base material is oriented with respect to the thickness direction of the thick parts of the molded product. The angle of orientation should be 60–120 degrees, preferably 70–110 degrees, more preferably 80–100 degrees, and most desirably 90 degrees (right angle). Orientation in this way prevents the product warpage and enhances the product strength.

The molding compound (or the raw material mixture) should be used in the form of pellets (prepared by extrusion melting and mixing) or chips (prepared from extrudate by crushing after cooling). Injection molding or transfer molding may be carried out in any manner according to the procedure commonly employed for thermosetting resins.

To be concrete, injection molding should be carried out under the following conditions for the compound in which the thermosetting resin as component (B) is phenolic resin.

| Cylinder temperature | 60–100° C. |
|---|---|
| Injection pressure | 5–190 MPa |
| Injection time | 5–15 seconds |
| Mold temperature | 150–190° C. |
| Curing time | 15–90 seconds |

Transfer molding should be carried out under the following conditions for the compound in which the thermosetting resin as component (B) is phenolic resin.

| Transfer pot temperature | 75–100° C. |
|---|---|
| Plunger pressure | 1–10 MPa |
| Injection time | 5–20 seconds |
| Mold temperature | 160–190° C. |
| Curing time | 15–90 seconds |

In the present invention, injection molding or transfer molding is carried out, with the molding conditions, the gate position, and the number of gates properly adjusted, so that the fibrous base material is oriented in any desired direction in the molded product. The desired direction of orientation is 60–120 degrees with respect to the thickness direction of thick parts. The thus oriented fibrous base material prevents the molded product (separator) from warping and enhances the strength of thin parts.

The process of the present invention eliminates difficulties involved with the conventional compound for injection molding, transfer molding, and extrusion molding. Thus, it greatly contributes to productivity and permits mass production of carbonaceous composite materials suitable for use as electric and electronic parts such as fuel cell separators, electromagnetic wave shields, and solar cells. It is appropriate for mass production of fuel cell separators.

The production process of the present invention can be applied not only to injection molding, transfer molding, and extrusion molding but also to compression molding, injection-compression molding, hydrostatic molding, belt pressing, and roll molding. These molding methods may be used alone or in combination with one another.

The fuel cell separator of the present invention has high strength and is free from warpage. It has a flexural strength of 40–100 MPa, preferably 40–90 MPa. It has a flexural modulus of 20–60 GPa, preferably 20–50 GPa. It has a strain of 0–1 mm, preferably 0–0.5 mm. It has an amount of warpage no greater than 0.5 mm, preferably no greater than 0.3 mm, more preferably 0–0.3 mm. These values were measured according to JIS K6911 (General test methods for thermosetting plastics) with a specimen, 100×10×4 mm, prepared from the compound for the fuel cell separator. The amount of warpage is measured with a height gauge or a three-dimensional measuring tool and expressed in terms of the value calculated by subtracting the thickness of the molded product from the height of the molded product placed on a surface plate.

The fuel cell separator of the present invention has a specific resistance no higher than 100 mΩ·cm, preferably no higher than 50 mΩ·cm, and more preferably 2–30 mΩ·cm. The specific resistance is measured according to JIS H0602 which specifies the four-probe method used to measure the resistivity of silicon single crystals and wafers.

In addition, the fuel cell separator of the present invention has an $N_2$ gas permeability (at 23° C.) no higher than 50 mL/m$^2$ ·24 hr·atm, preferably no higher than 30 mL/m$^2$·24 hr·atm, and more preferably no higher than 20 mL/m$^2$ ·24 hr·atm. The permeability is measured according to JIS K7126 (Method for evaluating the gas permeability of plastics films), Method B (isobaric method), with a specimen, 2 mm thick and 100 mm in diameter, prepared from the molding compound for the fuel cell separator.

The polymer electrolyte fuel cell according to the present invention is constructed of a number of unit cells, each consisting of a pair of electrodes holding a solid polymer electrolytic membrane between them and a pair of separators holding said electrodes between them and forming passages for gas supply and discharge. The unit cell is characterized in that its separator is entirely or partly the fuel cell separator specified as above in the present invention.

The fuel cell system is constructed of tens of unit cells which are stacked to form the battery module. As shown in FIG. 1, each unit cell consists of one electrolytic membrane of solid high polymer 2, two gas diffusion electrodes of carbon paper 3, 3, and two separators 1, 1, each having ribs 1a which form grooves 4 for gas (such as hydrogen and oxygen) to be supplied and discharged.

The unit cell is characterized in that its separator is entirely or partly the fuel cell separator specified as above in the present invention. To be concrete, it is desirable that the number of the fuel cell separators of the present invention accounts for no less than 50%, preferably 50–100%, more preferably 70–100%, most desirably 80–100%, of the total number of fuel cell separators. If this ratio is small, the resulting fuel cell is poor in vibration and shock resistance and hence it is impossible to achieve the object and effect of the present invention. The fuel cell separator of the present invention may be supplemented with ordinary fuel cell separators.

The solid polymer electrolytic membrane mentioned above may be an ordinary one which is commonly used for polymer electrolyte fuel cell. For example, it may be polytrifluorostyrenesulfonic acid or perfluorocarbonsulfonic acid (trade name: Nafion), which is a proton-conductive ion-exchange membrane formed from fluoroplastics. This electrolytic membrane has its surface coated with a paste of carbon powder (supporting platinum or platinum alloy as a catalyst) dispersed in an organic solvent, such as a mixture of water and lower fatty alcohol containing perfluorocarbonsulfonic acid. (This mixture is designated as Nafion 117 solution.) The paired electrodes holding the solid polymer electrolytic membrane between them may be formed from carbon paper, carbon felt, or carbon cloth woven from carbon fiber.

The electrolytic membranes and electrodes are integrally formed by pressing with heating at 120–130° C., with the former interposed between the latter. The same result may be obtained by bonding with an adhesive.

The integrated electrolytic membranes and electrodes are subsequently combined with a pair of separators in such a way that the separator forms passages for fuel gas to be supplied and discharged. In this way there is obtained a unit cell. This procedure is accomplished by applying an adhesive to the rib of the separator which comes into contact with the electrode.

According to the present invention, the polymer electrolyte fuel cell is characterized in that all or part (preferably more than 50%) of its separators are the fuel cell separators defined above in the present invention. Therefore, the fuel cell of the present invention is free from warpage and has good vibration and shock resistance. It is suitable for use as a mobile power source for automobiles, hybrid cars, and small ships.

It will also find use in various applications, such as small-scale local power generation, domestic power generation, simple power source at camping sites, power source for artificial satellites and space development.

Effects of the Invention

The compound used as the raw material mixture in the present invention does not stick to the screw of the injection molding machine or extrusion molding machine, nor does it suffer slipping due to compression and sticking between the screw and the cylinder. Therefore, it can be processed by injection molding, transfer molding or extrusion molding without difficulties encountered in the past. This greatly contributes to productivity.

The carbonaceous composite material of the present invention is formed such that the fibrous base material therein is oriented at 60–120 degrees with respect to the thickness direction of the thick parts. In other words, the fibrous base material is oriented in the direction against the residual stress or favorable to reinforcement of structurally or configurally weak parts. Thus the resulting molded product has greatly increased strength.

Moreover, the fuel cell separator of the present invention has high strength and warpage-free uniform dimensional stability. Those polymer electrolyte fuel cell in which the separators of the present invention are used exclusively or partially are superior in vibration resistance and shock resistance. They are suitable for use as a mobile power source for automobiles, hybrid cars, and small ships.

EXAMPLE

In what follows, the invention will be described in more detail with reference to examples and comparative examples, which are not intended to restrict the scope thereof.

Example 1

A mixture composed of the following components was extruded into pellets, each measuring 5 mm long and 5 mm in diameter.

Graphite (100 pbw): particle average 50 $\mu$m, natural flake graphite, purity 99.7%.

Phenolic resin (35 pbw): Novolak type phenols, Flow length at 135° C.: 180 mm, Gel time at 150° C.: 144 sec.

Carbon fiber (5 pbw): 6 mm long, 7 $\mu$m in diameter.

The phenolic resin spread to form a circle, 120 mm in diameter, when tested for fluidity in the following manner.

Method for Evaluation of Fluidity

A resin sample (5 g) is placed at the center of a flat mold. The sample is compression-molded at a surface pressure of 29.4 MPa for 3 minutes with heating at 150° C. which is equal to the melting temperature in injection molding. The circular spreading of the sample is regarded as the degree of fluidity.

The pellets obtained as above were injection-molded under the following conditions by using a 75 ton injection molding machine. Injection molding was accomplished satisfactorily through regular pellet feeding (from the hopper to the heating cylinder), smooth transfer by screw rotation, stable metering, and final injection into the mold for further heating.

| | |
|---|---|
| Cylinder temperature | 60–100° C. |
| Injection pressure | 10 MPa |
| Injection time | 5–15 seconds |
| Mold temperature | 160–190° C. |
| Cure time | 15–90 seconds |

Figure 2A:
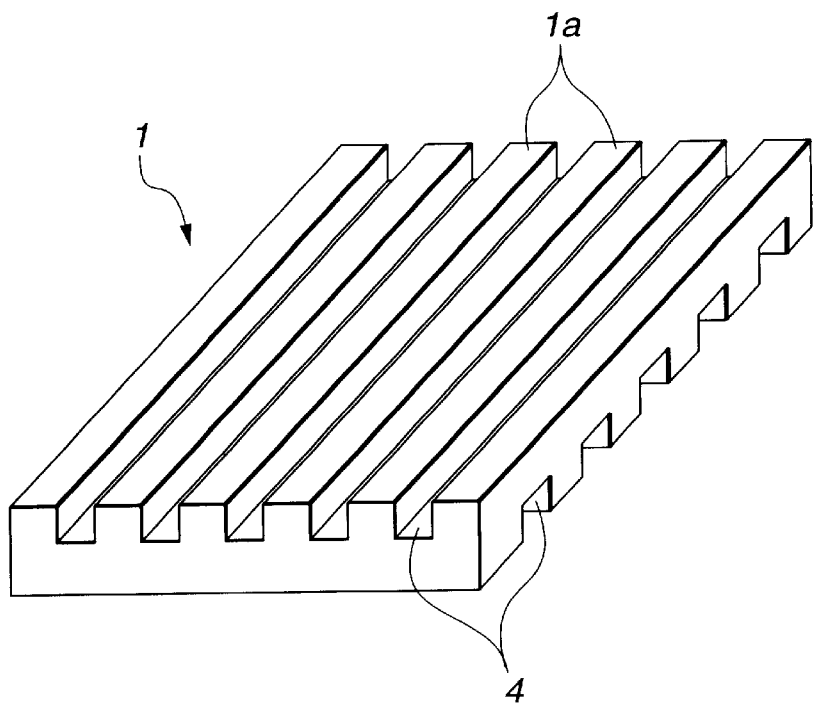
FIG. 2 is a perspective view of the fuel cell separator pertaining to one example of the present invention. Part (A) depicts the one which has grooves for gas supply and discharge on both sides thereof. Part (B) depicts the one which has grooves for gas supply and discharge on one side thereof.
Figure 2B:
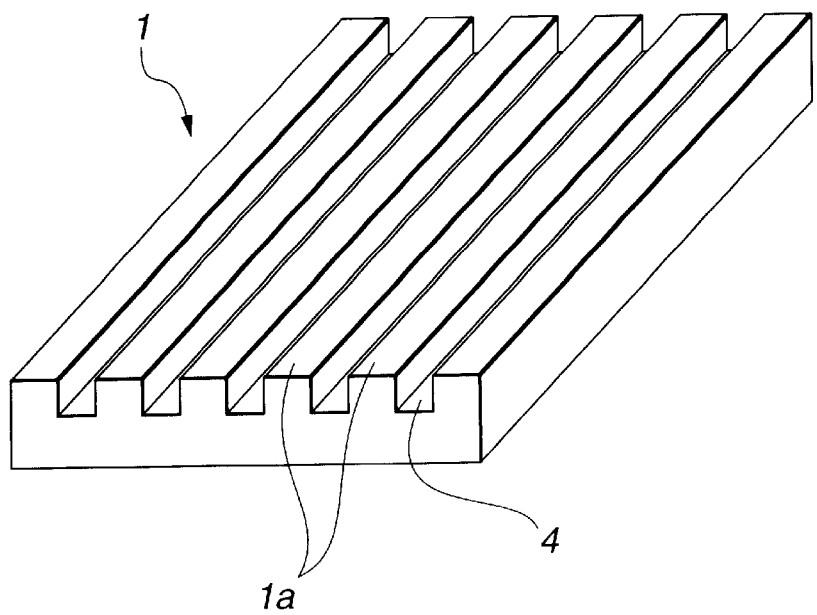
Figure 3:
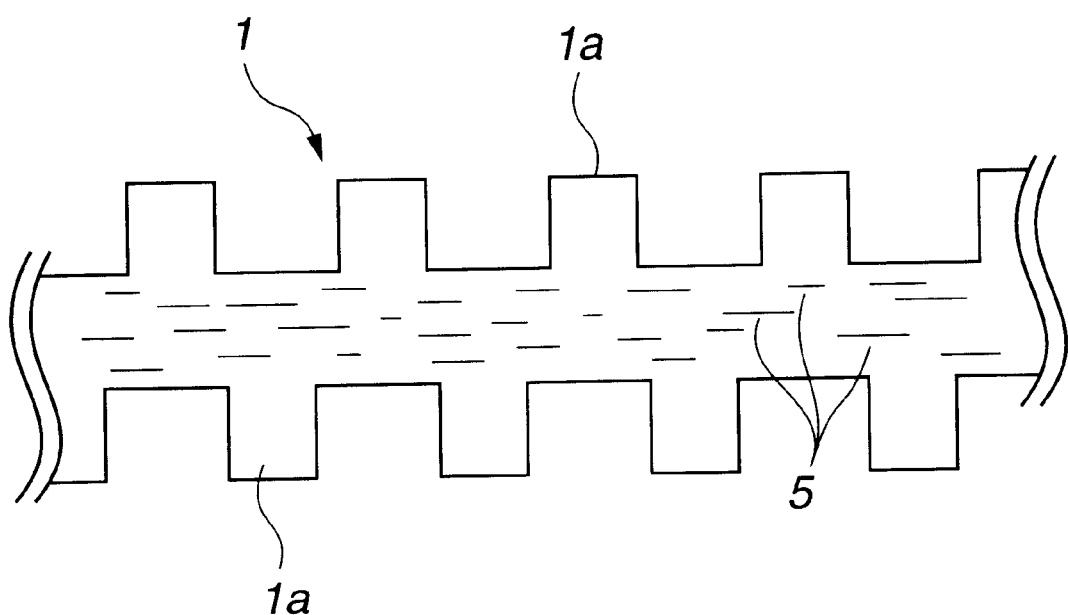
FIG. 3 is a schematic sectional view of the fuel cell separator according to the present invention.

The above-mentioned pellets were injection-molded under the same condition as above by using a separator mold. Thus there was obtained a fuel cell separator 1 as shown in FIGS. 2(A) and 2(B). It measures 100 mm long, 100 mm wide, and 2.0 mm thick, and it has grooves 4 on-one side or both sides thereof. The amount of warpage is 0.3 mm. Observation of the cross section revealed that the fibrous base material is oriented at 80–100 degrees with respect to the thickness direction of the thick part.

Also, the above-mentioned pellets were injection-molded into a test piece, measuring 100×10×4 mm (in which the fibrous base material is oriented at 80–100 degrees with respect to the thickness direction of the thick part). This test piece was found to have a flexural strength of 45.2 MPa and a flexural modulus of 40 GPa measured according to JIS K6911.

Example 2

A mixture composed of the following components was extruded into pellets, each measuring 5 mm long and 5 mm in diameter.

Graphite (100 pbw): particle average 50 $\mu$m, natural flake graphite, purity 99.7%.

Phenolic resin (16.3 pbw): Novolak type phenols, Flow length at 135° C.: 180 mm, Gel time at 150° C.: 144 sec.

Carbon fiber (3.5 pbw): 6 mm long, 7 $\mu$m in diameter.

The pellets obtained as above were injection-molded under the following conditions by using a 75 ton injection molding machine. Injection molding was accomplished satisfactorily through regular pellet feeding (from the hopper to the heating cylinder), smooth transfer by screw rotation, stable metering, and final injection into the mold for further heating.

| | |
|---|---|
| Cylinder temperature | 60–100° C. |
| Injection pressure | 10 MPa |

| | |
|---|---|
| Injection time | 5–15 seconds |
| Mold temperature | 160–190° C. |
| Cure time | 15–90 seconds |

The above-mentioned pellets were injection-molded under the same condition as above by using a separator mold. Thus there was obtained a fuel cell separator 1 as shown in FIGS. 2(A) and 2(B). It measures 100 mm long, 100 mm wide, and 2.0 mm thick, and it has grooves 4 on one side or both sides thereof. The amount of warpage is 0.28 mm. Observation of the cross section revealed that the fibrous base material is oriented at 70–110 degrees with respect to the thickness direction of the thick part.

Also, the above-mentioned pellets were injection-molded into a test piece, measuring 100×10×4 mm (in which the fibrous base material is oriented at 70–110 degrees with respect to the thickness direction of the thick 20 part). This test piece was found to have a flexural strength of 65 MPa and a flexural modulus of 45 GPa measured according to JIS K6911.

Comparative Example 1

The same procedure as in Example 1 was repeated to prepare pellets (5 mm long and 5 mm in diameter) except that the carbon fiber was not added.

An attempt was made to carry out injection molding for the pellets under the same conditions as in Example 1. However, the pellets were not moldable because of their sticking to the screw surface. (The material sticking to the screw surface causes the succeeding material to slip, thereby preventing the stable feeding to the forward end.)

Comparative Example 2

The same compound as in Example 1 (except that the carbon fiber was not added) was fed directly into an injection molding machine. The compound did not enter the cylinder because of slipping, or the compound entered the cylinder but was not carried to the forward end because of slipping at the center of the screw. Thus, it was impossible to accomplish molding.

Comparative Example 3

The same compound as in Example 1 was filled into the separator mold. Compression molding was carried out at 150° C. and 19.6 MPa for 5 minutes to give the fuel cell separator 1, measuring 100 mm long, 100 mm wide, and 2.0 mm thick. It has grooves 4 for gas supply and discharge on one side or both sides thereof, as shown in FIGS. 2(A) and 2(B).

The resulting separator was tested for strength in the same way as mentioned above. The flexural strength was 35 MPa, the flexural modulus was 45 GPa, and the amount of warpage was 0.5 mm.

Observation of the cross section revealed that the fibrous base material is oriented at 5–160 degrees with respect to the thickness direction of the thick part.

Comparative Example 4

The same compound as in Example 2 was filled into the separator mold. Compression molding was carried out at 150° C. and 19.6 MPa for 5 minutes to give the fuel cell separator 1, measuring 100 mm long, 100 mm wide, and 2.0 mm thick. It has grooves 4 for gas supply and discharge on one side or both sides thereof, as shown in FIGS. 2(A) and 2(B).

The resulting separator was tested for strength in the same way as mentioned above. The flexural strength was 33 MPa, the flexural modulus was 46.5 GPa, and the amount of warpage was 0.3 mm.

Observation of the cross section revealed that the fibrous base material is oriented at 5–160 degrees with respect to the thickness direction of the thick part.

Example 3

Polymer Electrolyte Fuel Cell (1)

An integrated electrode was prepared in the usual way by bonding a pair of electrodes (carbon paper from Chemix Co., Ltd.) to an electrolytic membrane of solid polymer ("Nafion"). This integrated electrode was held between two pieces of the fuel cell separator prepared in Example 1. Thus there was obtained a unit cell having passages for fuel gas supply and discharge. A fuel cell system was constructed from 50 unit cells which are tied together with bolts and nuts.

The fuel cell system was capable of charging and discharging, functioning satisfactorily.

The unit cell was tested for shock resistance according to JIS K7085 (Multiaxial shock test for carbon fiber-reinforced plastics). The separator was not broken in this test.

Example 4

Polymer Electrolyte Fuel Cell (2)

An integrated electrode was prepared in the usual way by bonding a pair of electrodes (carbon paper from Chemix Co., Ltd.) to an electrolytic membrane of solid polymer ("Nafion"). This integrated electrode was held between two pieces of the fuel cell separator prepared in Example 2. Thus there was obtained a unit cell having passages for fuel gas supply and discharge. A fuel cell system was constructed from 50 unit cells which are tied together with bolts and nuts.

The fuel cell system was capable of charging and discharging, functioning satisfactorily.

The unit cell was tested for shock resistance according to JIS K7085 (Multiaxial shock test for carbon fiber-reinforced plastics). The separator was not broken in this test.

What is claimed is:

1. A fuel cell separator having grooves for gas supply and discharge on one side or both sides thereof which is formed from a carbonaceous composite material molded from a carbonaceous composite compound composed mainly of graphite, a thermosetting resin, and a fibrous base material, wherein molding is carried out in such a way that said fibrous base material is oriented in said carbonaceous composite material, said fuel cell separator being characterized by a flexural strength, of 40–100 MPa, a flexural modulus of 20–60 GPa, and an amount of warpage no larger than 0.5 mm, which are measured according to JIS K6911.

2. The fuel cell separator as defined in claim 1, wherein the fibrous base material is oriented at 60–120 degrees with respect to a thickness direction of the molded product.

3. The fuel cell separator as defined in claim 1, wherein said graphite, thermosetting resin, and fibrous base material account for 100 pbw, 15–45 pbw, and 3–35 pbw, respectively, in the total amount of the composite material.

4. A polymer electrolyte fuel cell which is made up of a number of unit cells, each cell consisting of a pair of electrodes holding an electrolytic membrane of solid high polymer between them and a pair of separators holding said electrodes between them, said separator forming passages for gas supply and discharge, wherein the separator is entirely or partly the fuel cell separator defined in claim 1, 2 or 3.

5. The fuel cell separator as defined in claim 1 or 2 wherein said graphite, thermosetting resin, and fibrous base material account for 100 pbw, 15–45 pbw, and 3–35 pbw, respectively, in the total amount of the composite material.

6. The fuel cell separator as defined in claim 1, wherein the graphite has an average particle diameter of 30–1,000 µm.

7. The fuel cell separator as defined in claim 1, wherein the thermosetting resin is at least one selected from the group consisting of phenolic resin, furan resin, polyimide resin, polycarbodiimide resin, polyacrylonitrile resin, pyrene-phenanthrene resin, polyvinyl chloride resin, epoxy resin, urea resin, diallyl phthalate resin, unsaturated polyester resin, and melamine resin.

8. The fuel cell separator as defined in claim 1, wherein the fibrous base material is at least one selected from the group consisting of ceramic fiber, natural mineral fiber, glass fiber, metal fiber, aramide fiber, carbon fiber, cellulose fiber, acrylic fiber, potassium titanate fiber, and boron fiber.

9. The fuel cell separator as defined in claim 8, wherein the fibrous base material is a carbon fiber of a length of 1–20 mm and a diameter of 3–10 µm.

* * * * *